United States Patent [19]

Umland et al.

[11] Patent Number: 5,773,499
[45] Date of Patent: Jun. 30, 1998

[54] PRESERVED AND STABILIZED NATURAL LATEX, WITH WATER-SOLUBLE CARBOXYLIC ACID SALTS

[75] Inventors: Henning Umland; Clara Petri, both of Winsen/Luhe, Germany

[73] Assignee: Schill & Seilacher (Gmbh & Co.), Hamburg, Germany

[21] Appl. No.: 818,707

[22] Filed: Mar. 14, 1997

[30] Foreign Application Priority Data

Mar. 25, 1996 [DE] Germany .................. 196 13 011.5

[51] Int. Cl.$^6$ .................................................. C08K 5/098
[52] U.S. Cl. .................. 524/394; 524/396; 524/397; 524/400; 524/925; 524/926
[58] Field of Search ................... 524/394, 925, 524/926, 396, 397, 400; 562/512

[56] References Cited

U.S. PATENT DOCUMENTS

| | | | |
|---|---|---|---|
| Re. 29,821 | 10/1978 | Aron | 524/397 |
| 2,467,054 | 4/1949 | Rumbold | 524/397 |
| 2,743,305 | 4/1956 | Townsend | 524/926 |
| 2,802,039 | 8/1957 | Broeck | 524/926 |
| 2,839,483 | 6/1958 | Howland et al. | 524/397 |
| 2,888,504 | 5/1959 | Broeck | 524/926 |
| 3,027,351 | 3/1962 | Lichty | 524/255 |
| 3,409,567 | 11/1968 | Dinsdale et al. | 524/926 |
| 3,730,943 | 5/1973 | Weisfeld et al. | 524/567 |
| 3,878,152 | 4/1975 | Distler et al. | 524/926 |

FOREIGN PATENT DOCUMENTS

| | | |
|---|---|---|
| 639077 | 3/1962 | Canada . |
| 57-206636 | 12/1982 | Japan . |
| 60-156638 | 8/1985 | Japan . |

OTHER PUBLICATIONS

Wong Niap Poh; Developments in Natural Rubber Latex: Production, Properties, Stability; *Elastomerics*, Dec. 1989.

D.C. Blackley et al.; "Effect of Potassium Fatty–Acid Soaps Upon Mechanical and . . . "; *Plastics and Rubber: Materials and Application*; May 1979.

Primary Examiner—Veronica P. Hoke
Attorney, Agent, or Firm—Collard & Roe, P.C.

[57] ABSTRACT

A natural rubber latex has been preserved and stabilized by at least one water-soluble carboxylic acid salt of the formula $R—COO^-M^+$, in which R is an alkyl or alkenyl radical having a branched carbon chain and $M^+$ is a monovalent cation. A process for the preparation of the rubber latex mixture uses a water-soluble carboxylic acid salt for the preservation and stabilization of natural latex.

25 Claims, 7 Drawing Sheets

FIG. 2  VFA numbers Examples 2
Preserving system: ZnO/Ammonia/Potassium neodecanoate FIG. 3  VFA numbers Example 3
Preserving system: ZnO/Ammonia/Potassium-2-ethyl hexanoate FIG. 4  VFA numbers Examples 4 and 5 measured in accordance with DIN ISO 506

FIG. 6  MST Values Examples 4 and 5 measured in accordance with DIN 53 567

FIG. 7 MST Values and VFA numbers Example 6

PRESERVED AND STABILIZED NATURAL LATEX, WITH WATER-SOLUBLE CARBOXYLIC ACID SALTS

BACKGROUND OF THE INVENTION

1. Field of the Invention

The present invention relates to a preserved and stabilized natural rubber latex, a process for the preparation thereof and the use of carboxylic acid salts for the preservation and stabilization thereof.

2. The Prior Art

Natural rubber latex, the milky sap of the rubber tree *Hevea brasiliensis* and of other rubber-supplying plants, contains polyisoprene which is present very finely dispersed in the aqueous phase and represents the actual natural rubber, and also, as secondary components, proteins, sugars, polysaccharides and inorganic salts.

These secondary components, in particular, form a culture medium for bacteria which multiply quickly in the latex and cause it to perish, which finally results in coagulation, i.e., in the precipitation of the polymer phase.

Since there are often long distances, and possibly relatively long storage times, between extraction on the rubber plantations and further processing, if processing to solid rubber does not take place on site, the latex is normally treated with suitable agents immediately after extraction. This treatment is to provide protection against bacterial attack of the latex and for stabilization of the physical-chemical properties of the latex.

The use of ammonia in high dosage (High ammonia latex) or combinations of ammonia with boric acid, sodium pentachlorophenolate, zinc diethyldithiocarbamate (ZDEC) or tetramethyltriuram disulphide (TMTD) and zinc oxide (Low ammonia latex) is known for preserving natural latex (Wong Niap Poh; *Developments in Natural Rubber Latex: Production, Properties, Stability; ELASTOMERICS*, December 1989).

The known methods mentioned above for latex preservation are not without disadvantages. For example, the use of high concentrations of ammonia results in technical and occupational hygiene problems. Also the use of boric acid, sodium phenolate, ZDEC and TMTD are toxicologically unacceptable. Moreover, under certain conditions ZDEC and TMTD split off diethylamine or dimethylamine, from which carcinogenic nitrosamines can then be formed due to the action of the almost omnipresent nitrogen oxides or other nitrosation agents.

Since food handling materials and articles for the medical and hygiene sectors are produced on a large scale from natural latex, there is understandably interest in preservatives with low toxicity, in particular in those which are not potential formers of nitrosamines.

SUMMARY OF THE INVENTION

It is an object of the present invention to provide a process for the preservation and stabilization of natural rubber latex, in which substances having comparatively low toxicity are used which cannot release nitrosatable amines or the secondary products of which cannot form nitrosamines.

It is a further object that natural latex be preserved and be stabilized by using a suitable additive with the objective of lowering the level of nitrosatable amines, and of carcinogenic nitrosamines which occur as secondary products thereof, in the latex and the articles produced therefrom.

It has surprisingly been shown that natural rubber latex can be preserved and stabilized in an outstanding manner by adding water-soluble carboxylic acid salts of the formula $$R\text{—}COO^-M^+$$

in which R is a branched alkyl radical having 4 to 17 carbon atoms or a branched alkenyl radical having 4 to 17 carbon atoms; and preferably the number of carbon atoms is 6 or ranges from 7 to 12. $M^+$ is a monovalent cation.

Examples of R are 1-ethylpentyl, 1,1-dimethylheptyl, 2,4,4-trimethylpentyl or the isododecyl radical. Examples of $M^+$ are alkali metals such as $K^+$, $Na^+$, or include $NH_4^+$ and the cations derived from alkanol amines such as, for example, $HO\text{—}CH_2\text{—}CH_2\text{—}NH_3^+$.

The carboxylic acid salts according to the invention are not only known to be less toxic than the known preservatives such as, for example, boric acid, sodium pentachlorophenolate, ZDEC and TMTD, but also, on account of their chemical composition, they are not potential formers of nitrosamines. Moreover, on account of their high degree of water solubility in the washing processes than often occur during the production process for latex articles, these salts can largely be removed again from the articles, whereby the toxicological risk, if present at all, is reduced even further.

Furthermore, on account of their water solubility, these salts offer the advantage in terms of industrial application that they can be directly added to the natural latex or added in the form of an aqueous solution. On the other hand, for example ZDEC and TMTD like other water-insoluble chemicals must initially be converted into an aqueous dispersion by wet milling in a ball mill or the like.

The amount of water-soluble branched carboxylic acid salt according to the invention which is added to the latex to be preserved and stabilized according to the invention is from 0.001% to 1.0% by weight, in particular from 0.005% to 0.5% by weight, and preferably from 0.01% to 0.1% by weight, based upon the weight of the natural rubber latex used.

Furthermore, the latex according to the invention can additionally contain from 0.05% to 1.0% by weight, and preferably from 0.1% to 0.5% by weight, based upon the weight of the natural rubber latex used, of one or more water-soluble bases. The water-soluble bases can include ammonia, potassium hydroxide and/or sodium hydroxide. Alternatively, these based can also be selected from the group of alkanol amines such as, for example, 2-aminoethanol and 2-amino-2-methyl-propanol.

The natural rubber latex according to the invention can additionally also contain one or more of the known preservatives named above such as, for example, ammonia and zinc oxide. For example, it can contain from 0.05% to 1.00% by weight and preferably from 0.10% to 0.50% by weight of ammonia based upon the weight of the natural rubber latex used. It can contain for example from 0.01% to 1.0% by weight and preferably from 0.02% to 0.2% by weight of zinc oxide, based upon the weight of the natural rubber latex used. Ammonia and zinc oxide can also be present together.

Thus, the present invention is also a preserved and stabilized natural rubber latex composition comprising a mixture of natural latex; (a) from 0.001% to 1.0% by weight of at least one water-soluble carboxylic acid salt of the formula $R\text{—}COO^-M^+$ in which R is selected from the group consisting of a branched alkyl radical having 4 to 17 carbon atoms and a branched alkenyl radical having 4 to 17 carbon atoms; and $M^+$ is a monovalent cation; (b) from 0.05% to 1.0% by weight of at least one water-soluble base; (c) from 0.01% to 1.0% by weight of zinc oxide; and (d) the balance up to 100% by weight being the natural rubber latex; with the weight percent of the branched carboxylic acid salt, and the weight percent of the water soluble base, and the weight percent of the zinc oxide each being based upon the weight of the natural rubber latex used.

The present invention is further directed to a process for the preparation of a preserved and stabilized natural rubber latex comprising the steps of providing a natural rubber latex; and forming a mixture by adding to said natural latex (a) from 0.001% to 1.0% by weight of at least one water-soluble carboxylic acid salt of the formula R—COO$^-$M$^+$ in which R is selected from the group consisting of a branched alkyl radical having 4 to 17 carbon atoms and a branched alkenyl radical having 4 to 17 carbon atoms; and M$^+$ is a monovalent cation; (b) from 0.05% to 1.0% by weight of a least one water-soluble base; (c) from 0.05% to 1.00% by weight of ammonia; (d) from 0.02% to 0.2% by weight of zinc oxide; (e) the balance up to 100% by weight of said natural rubber latex; and with the weight percent of the branched carboxylic acid salt, the weight percent of the water-soluble base, the weight percent of ammonia and the weight percent of zinc oxide each being based upon the weight of the natural rubber latex used.

The bacterial or enzymatic degradation of latex constituents causes short-chain fatty acids to be formed which cause the pH value of the latex to fall. The level of short-chain fatty acids in a latex and thus its degree of decomposition is characterized by the VFA number (volatile fatty acids) which is determined in accordance with DIN ISO 506. The VFA number is obtained when the short-chain volatile fatty acids are distilled off from the latex serum and then acidified with sulphuric acid, and this is then determined by titrimetry. The VFA number corresponds to the quantity of potassium hydroxide in grams which is required to neutralize the distilled-off fatty acids from a quantity of latex corresponding to 100 g of dry matter. The VFA number should therefore be as low as possible.

The KOH number which is determined in accordance with ISO 127, corresponds to the quantity of potassium hydroxide in grams which is equivalent to the acids present as ammonium salts in a quantity of latex corresponding to 100 g of dry matter. This KOH number also provides information about the concentration of the acids formed by bacterial decomposition. The KOH number should therefore also be as low as possible.

A parameter important for the processing of latex is mechanical stability (MST) which provides information about the resistance of a latex to shear stress. In the MST test in accordance with DIN 53 567, the latex is stirred with a high-speed disk agitator under precisely defined conditions until it coagulates. The MST value is the time in seconds which elapses until the appearance of the first agglomerates of coagulated rubber.

Normally, in addition to the preserving system of the invention, other salts, e.g., the potassium or ammonium salts, of straight-chain fatty acids with a chain length of 8 to 18 carbon atoms can be added. Examples include potassium caprylate, ammonium laurate or potassium oleate, which can also be added to the latex as a stabilizer and to raise the MST value to the level necessary in each case for the desired application (D. C. Blackley et al; *"Effect of Potassium Fatty -Acid Soaps Upon Mechanical and Chemical Stability of Natural Rubber Latex;" PLASTICS AND RUBBER: MATERIALS AND APPLICATION;* May 1979). However, unlike the carboxylic acid salts according to the invention having a branched carbon chain, it is known that these other salts do not have a preserving effect on the latex. Such straight-chain salts can additionally be present in the latex according to the invention, with their quantity being at most 0.5% by weight based upon the weight of the latex used.

A further surprising advantage of the carboxylic acid salts according to the invention having a branched carbon chain is that they have a stabilizing effect on the latex in the same way as the above-mentioned salts of straight-chain fatty acids and can therefore replace these completely or partially.

BRIEF DESCRIPTION OF THE DRAWINGS

Other objects and features of the present invention will become apparent from the following detailed description considered in connection with the accompanying drawing which discloses several embodiments of the present invention. It should be understood, however, that the drawing is designed for the purpose of illustration only and not as a definition of the limits of the invention.

In the drawing.

Other objects and features of the present invention will become apparent from the following Examples, which disclose the embodiments of the present invention. It should be understood, however, that the Examples are designed for the purpose of illustration only and not as a definition of the limits of the invention.

EXAMPLE 1 (COMPARISON)

50 kg of field latex (*Hevea brasiliensis*) were treated, accompanied by stirring, by adding in 1000 g of ammonia solution (8 wt. %), 25 g of an aqueous zinc oxide dispersion (50 wt. %) and 25 g of an aqueous TMTD dispersion (50 wt. %).

EXAMPLE 2

50 kg of field latex (*Hevea brasiliensis*) were treated, accompanied by stirring, by adding in 1000 g of ammonia solution (8 wt. %), 25 g of an aqueous zinc oxide dispersion (50 wt. %) and 12 g of an aqueous solution of potassium neodecanoate (potassium salt of 1,1-dimethylheptyl carboxylic acid) (50 wt. %).

EXAMPLE 3

50 kg of field latex (*Hevea brasiliensis*) were treated, accompanied by stirring, by adding in 1000 g of ammonia solution (8 wt. %), 25 g of an aqueous zinc oxide dispersion (50 wt. %) and 15 g of an aqueous solution of potassium-2-ethyl hexanoate (50 wt. %).

EXAMPLE 4 (COMPARISON)

50 kg of field latex (*Hevea brasiliensis*) were treated, accompanied by stirring, by adding in 1000 g of ammonia solution (8 wt. %), 25 g of an aqueous zinc oxide dispersion (50 wt. %), 25 g of an aqueous TMTD dispersion (50 wt. %) and 1000 g of an aqueous solution of ammonium laurate (20 wt. %). The solids content of the latex was then increased to 60 wt. % by centrifugation.

EXAMPLE 5

50 kg of field latex (*Hevea brasiliensis*) were treated, accompanied by stirring, by adding in 1000 g of ammonia solution (8 wt. %), 25 g of an aqueous zinc oxide dispersion (50 wt. %), and 12 g of an aqueous solution of potassium neodecanoate (50 wt. %). The solids content of the latex was then increased to 60 wt. % by centrifugation.

EXAMPLE 6

50 kg of field latex (*Hevea brasiliensis*) were treated, accompanied by stirring, by adding in 50 g of an aqueous zinc oxide dispersion (50 wt. %) and 40 g of an aqueous solution of potassium neodecanoate (50 wt. %). The mixture was adjusted to a pH value of 10 by the addition of potassium hydroxide solution (20 wt. %). The solids content of the latex was then increased to 60 wt. % by centrifugation.

The dispersions of zinc oxide used and TMTD used had been prepared beforehand in a known manner by wet milling in a ball mill.

All the test formulations were prepared and stored under the same conditions (i.e., slow stirring at room temperature), with small samples being taken at certain intervals to determine chemical-physical data.

The VFA numbers of the formulations of Examples 1 to 6 as a function of storage time are shown in FIGS. 1, 2, 3, 4, and 7. The temporal change in the VFA numbers (gradient of the lines of regression) and hence the preservative effect of the additives according to the invention is comparable within the framework of the spread of measured values with the values which are found when the known TMTD/zinc oxide combination is used. The fact that the VFA numbers in Example 3 as a whole are at a higher but still acceptable level is a result of the method used and can be explained by the steam volatility of 2-ethyl hexanoic acid which results in systematically higher values being measured.

In comparison to preserved latex, it is known that the VFA number of non-preserved natural rubber latex increases very quickly as a result of bacterial attack, and coagulation of the latex usually takes place within about 1 to 2 days.

Figure 1:
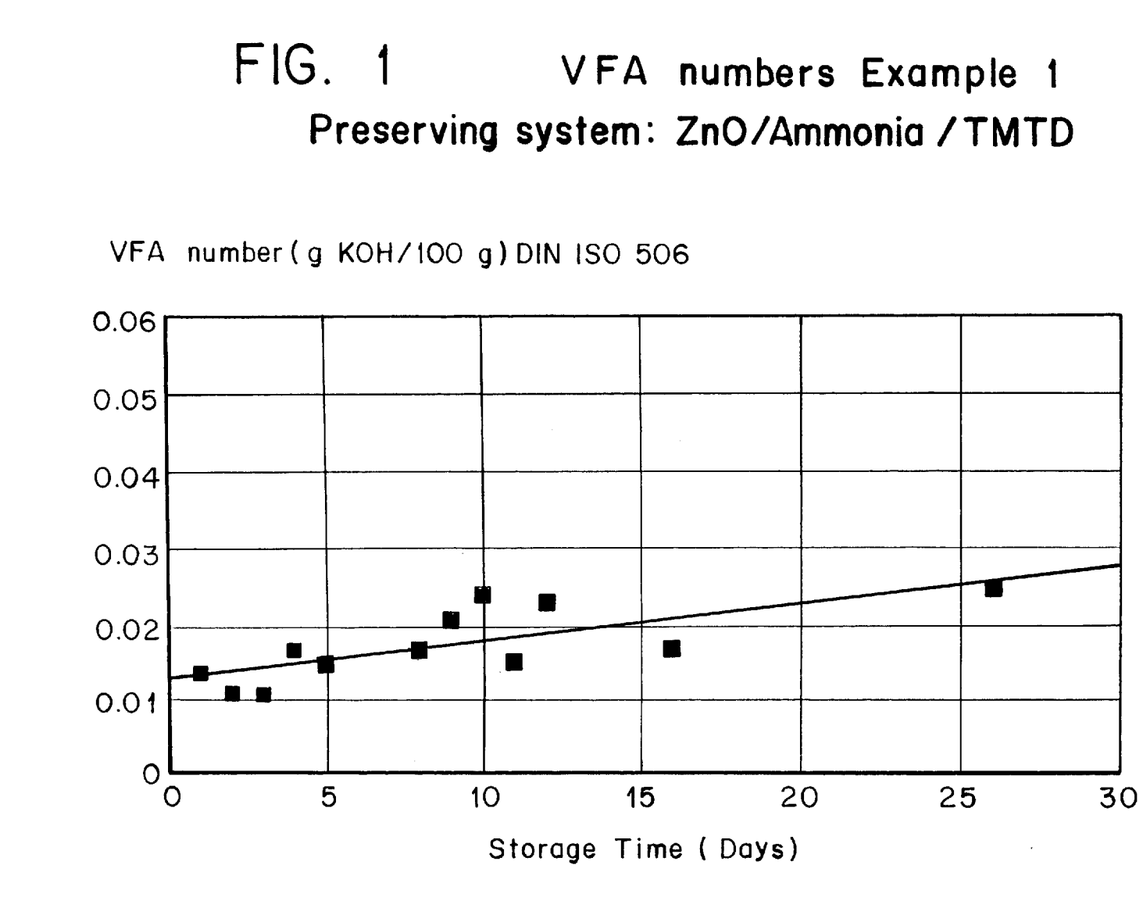
FIG. 1 shows VFA numbers based upon Example 1 versus storage time, wherein the preserving system is ZnO/Ammonia/TMTD.
Figure 2:
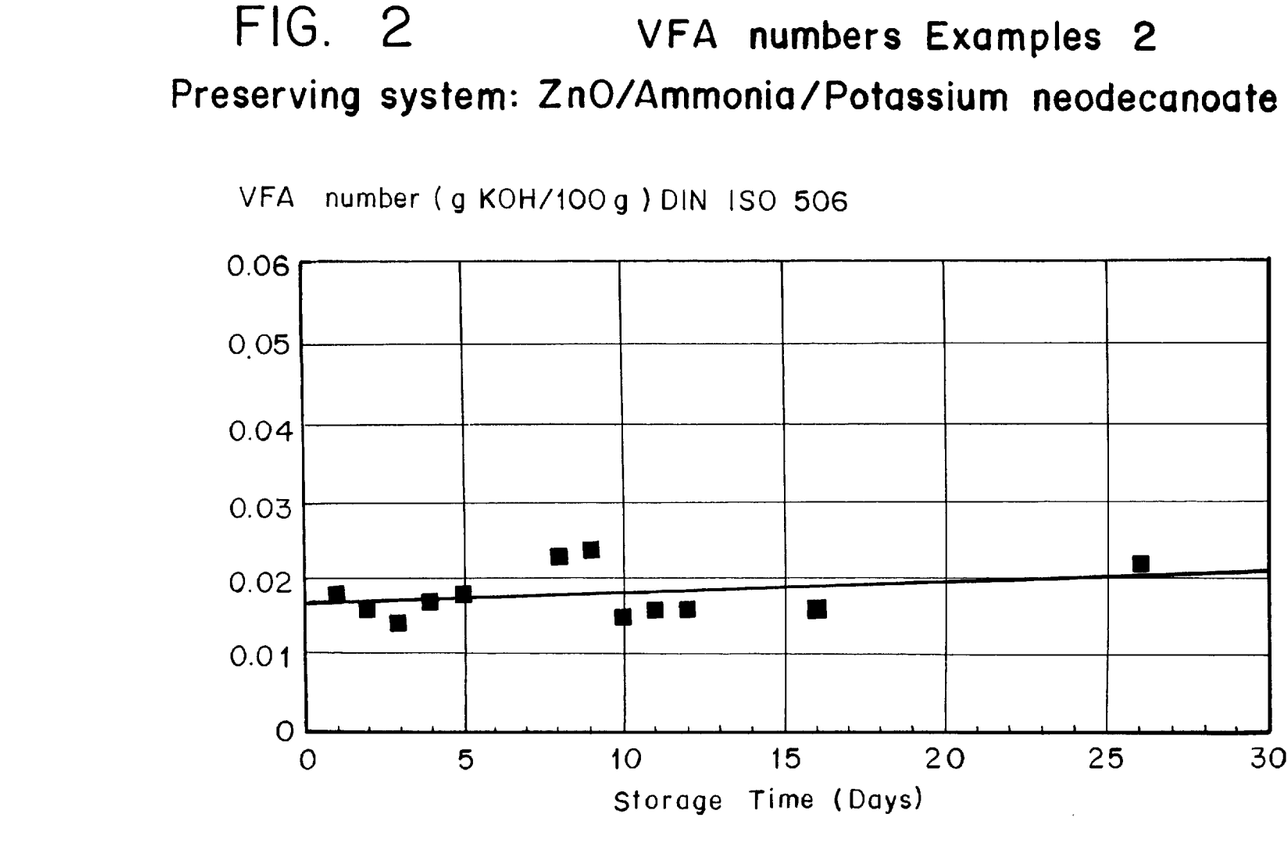
FIG. 2 shows VFA numbers based upon Example 2 versus storage time, wherein the preserving system is ZnO/Ammonia/Potassium neodecanoate.
Figure 3:
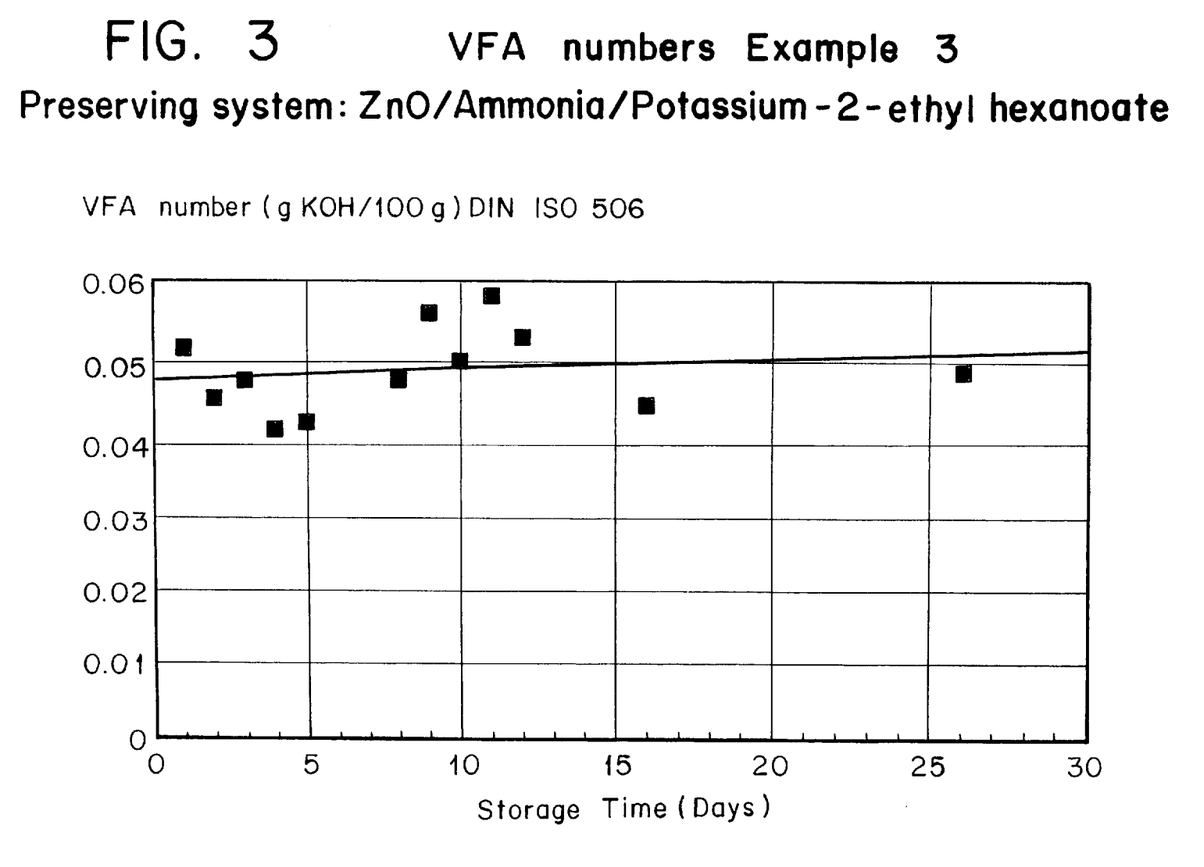
FIG. 3 shows VFA numbers based upon Example 3 versus storage time, wherein the preserving system is ZnO/Ammonia/Potassium-2-ethyl hexanoate.
Figure 4:
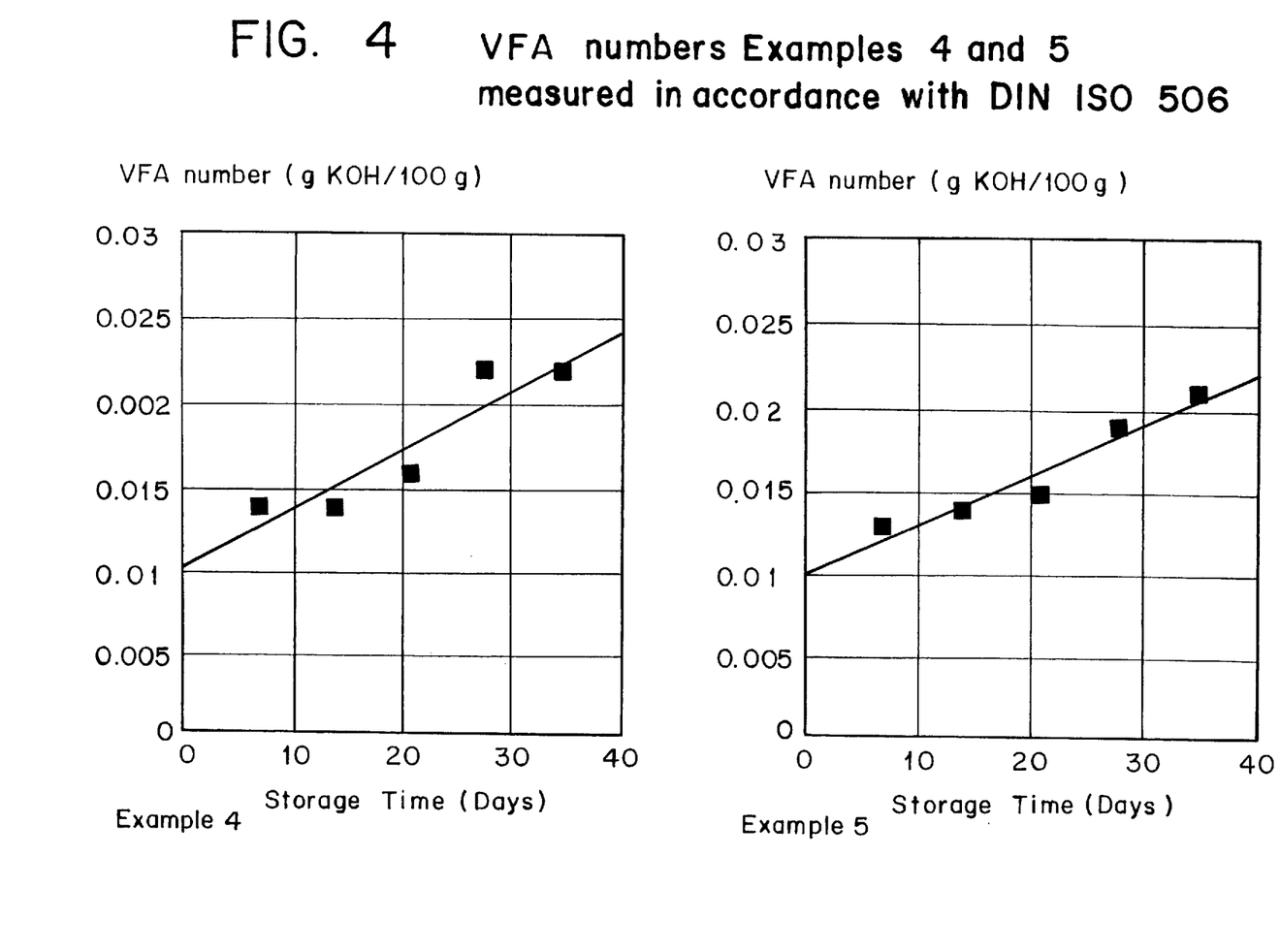
FIG. 4 shows VFA numbers based upon Examples 4 and 5 versus storage time.
Figure 5:
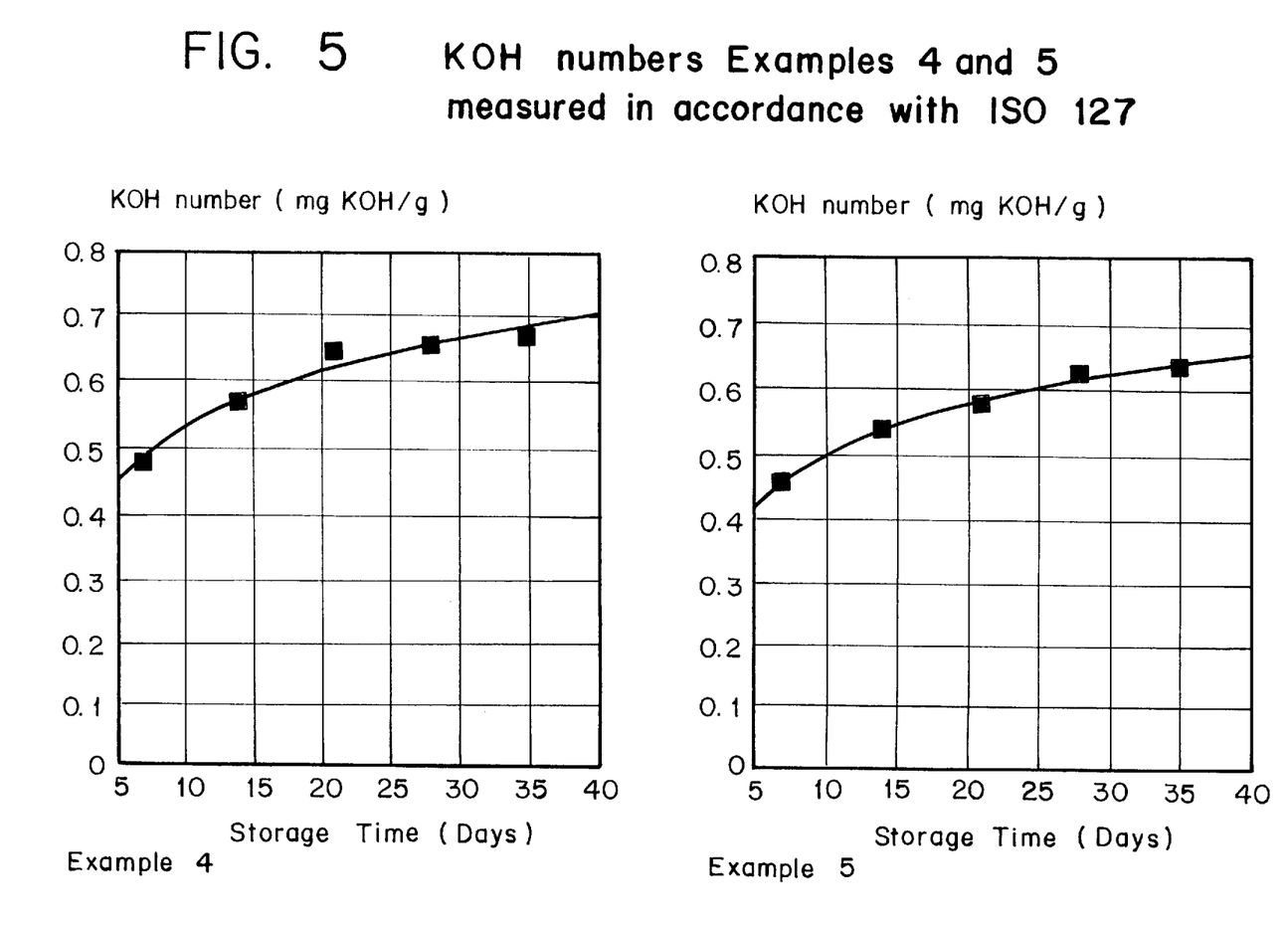
FIG. 5 shows KOH numbers based upon Examples 4 and 5 versus storage time.

In addition, the KOH number in accordance with ISO 127 was determined as a function of storage time in Examples 4 and 5 and is shown in FIG. 5. No significant difference between the preservation process according to the invention and the known process is to be detected.

Figure 6:
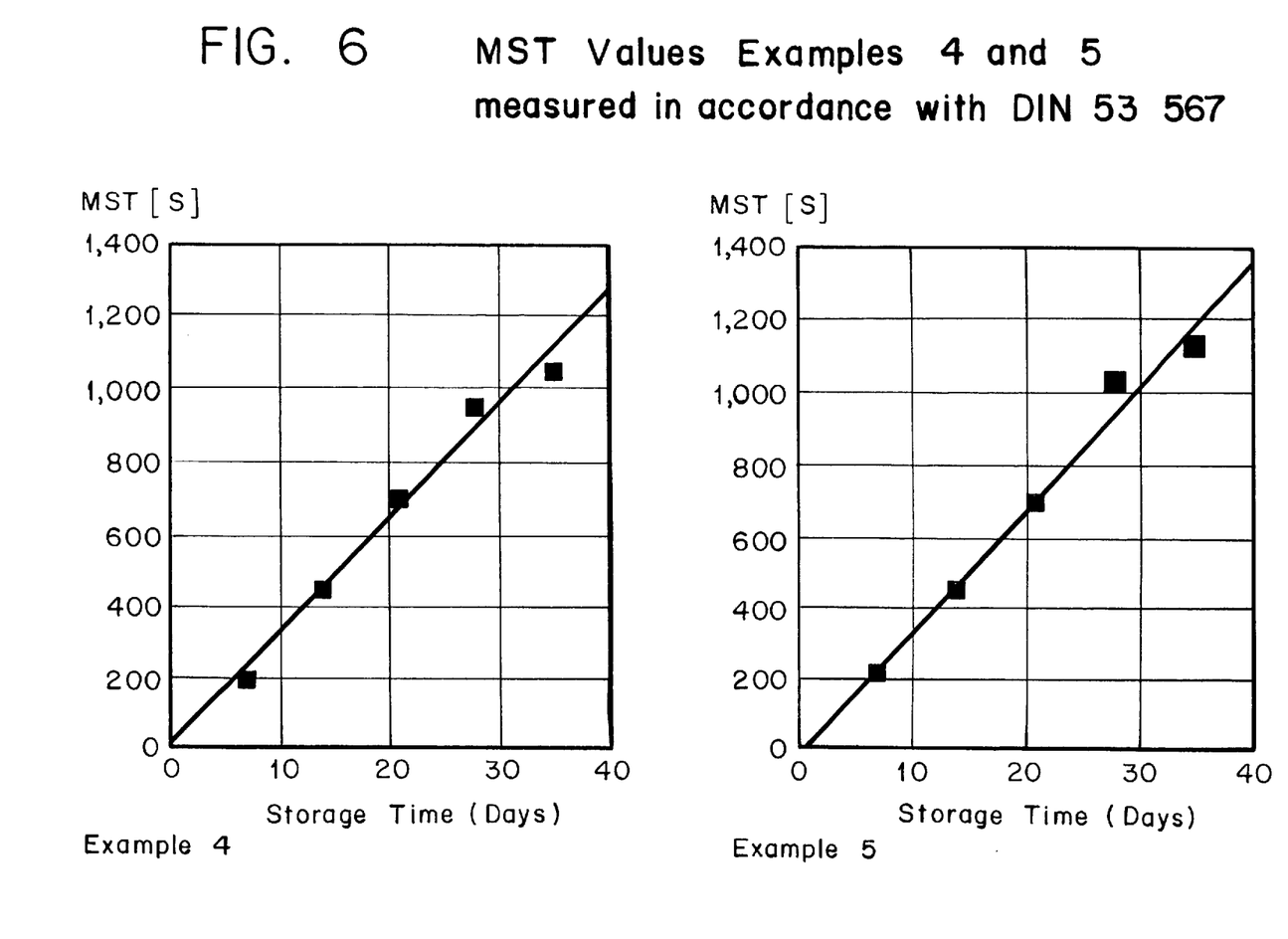
FIG. 6 shows MST values based upon Examples 4 and 5 versus storage time.

FIG. 6 shows the MST values measured in the test formulations of Examples 4 and 5 and in accordance with DIN 53 567 as a function of storage time. The value level and the temporal increase are comparable here too.

Figure 7:
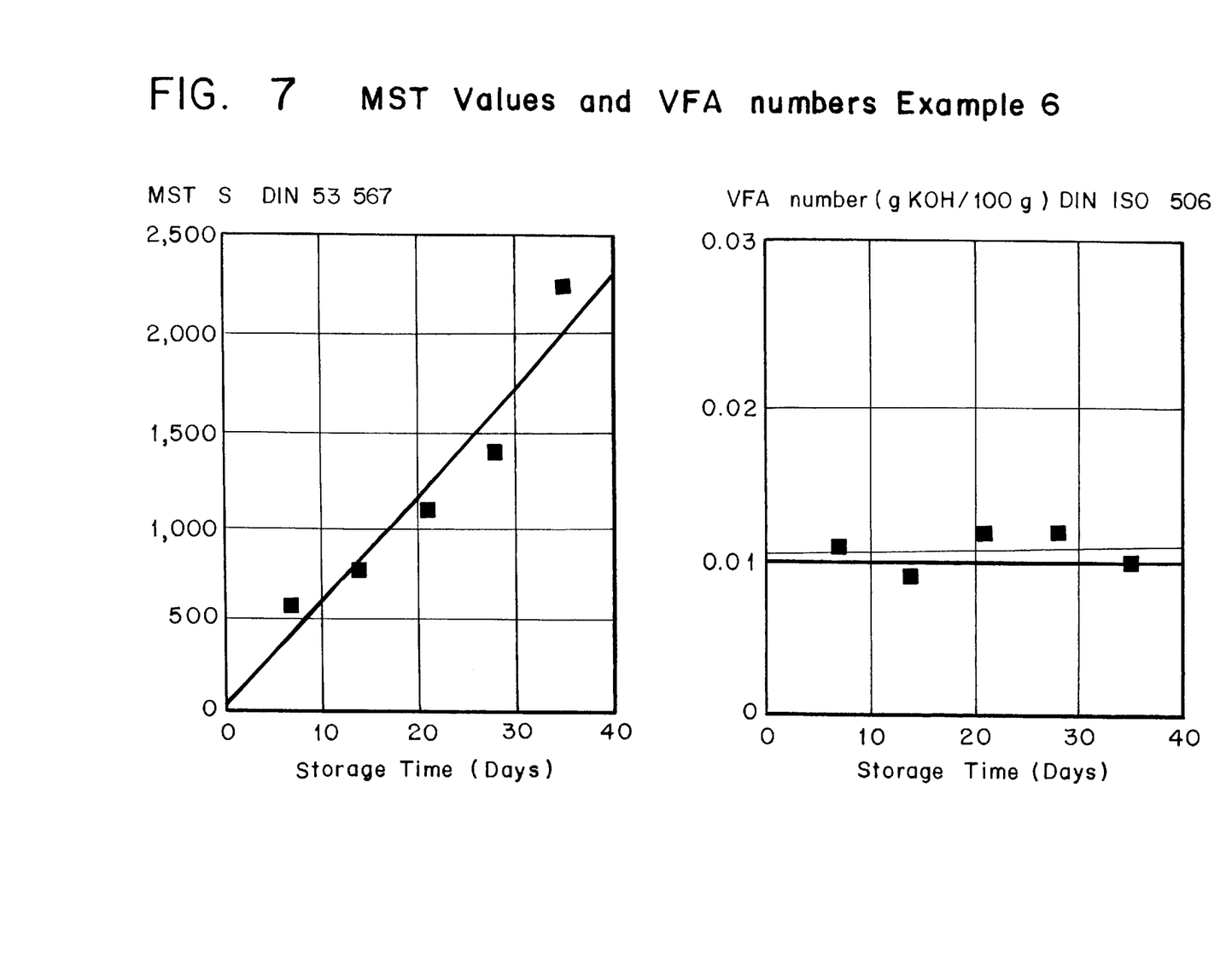
FIG. 7 shows MST values and VFA numbers based upon Example 6 versus storage time.

In the case of the ammonia-free test formulation of Example 6, the MST value and the VFA number were determined as a function of storage and time and are shown in FIG. 7. The measured VFA numbers are comparable with the other test formulations, the MST values are somewhat higher.

While several embodiments of the present invention have been shown and described, it is to be understood that many changes and modifications may be made thereunto without departing from the spirit and scope of the invention as defined in the appended claims.

What is claimed is:

1. A preserved and stabilized natural rubber latex composition comprising a mixture of
    natural rubber latex; and
    at least one water-soluble carboxylic acid salt of the formula R—COO$^-$M$^+$, in which R is selected from the group consisting of a branched alkyl radical having 4 to 17 carbon atoms and a branched alkenyl radical having 4 to 17 carbon atoms; and M$^+$ is a monovalent cation; and
    wherein there is from 0.001% to 1.0% by weight of the water-soluble carboxylic acid salt, based upon the weight of the natural rubber latex used.

2. The latex composition according to claim 1,
    wherein R contains 6 carbon atoms or 7 to 12 carbon atoms.

3. The latex composition according to claim 1,
    wherein M$^+$ is selected from the group consisting of Na$^+$, K$^+$, NH$_4$ and cations which are derived from alkanol amines; and
    wherein R is selected from the group consisting of 2-ethylpentyl, 1,1-dimethylheptyl, 2,4,4-trimethylpentyl, and isododecyl.

4. The latex composition according to claim 1,
    wherein there is from 0.005% to 0.5% by weight of the water-soluble carboxylic acid salt, based upon the weight of the natural rubber latex used.

5. The latex composition according to claim 1,
    wherein there is from 0.01% to 0.1% by weight of the water-soluble carboxylic acid salt, based upon the weight of the natural rubber latex used.

6. The latex composition according to claim 1,
    additionally comprising from 0.05% to 1.0% by weight of at least one water-soluble base, based upon the weight of the natural rubber latex used.

7. The latex composition according to claim 1,
    additionally comprising from 0.1% to 0.5% by weight of at least one water-soluble base, based upon the weight of the natural rubber latex used.

8. The latex composition according to claim 6,
    wherein the water-soluble base is selected from the group consisting of ammonia, potassium hydroxide, sodium hydroxide and an alkanol amine.

9. The latex composition according to claim 1,
    additionally comprising from 0.01% to 1.0% by weight of zinc oxide, based upon the weight of the natural rubber latex used.

10. The latex composition according to claim 1,
    additionally comprising from 0.02% to 0.2% by weight of zinc oxide, based upon the weight of the natural rubber latex used.

11. A preserved and stabilized natural rubber latex composition comprising a mixture of
    natural rubber latex;
    (a) from 0.001% to 1.0% by weight of at least one water-soluble carboxylic acid salt of the formula R—COO$^-$M$^+$ in which R is selected from the group consisting of a branched alkyl radical having 4 to 17 carbon atoms and a branched alkenyl radical having 4 to 17 carbon atoms; and M$^+$ is a monovalent cation;
    (b) from 0.05% to 1.0% by weight of at least one water-soluble base;
    (c) from 0.01% to 1.0% by weight of zinc oxide; and
    (d) the balance up to 100% by weight being the natural rubber latex;

with the weight percent of the branched carboxylic acid salt, and the weight percent of the water soluble base, and the weight percent of the zinc oxide each being based upon the weight of the natural rubber latex used.

12. A process for the preparation of a preserved and stabilized natural rubber latex comprising the steps of providing a natural rubber latex; and forming a mixture by adding to said natural rubber latex at least one water-soluble carboxylic acid salt of the formula R—COO$^-$M$^+$, in which R is a branched alkyl radical having 4 to 17 carbon atoms or a branched alkenyl radical having 4 to 17 carbon atoms; and M$^+$ is a monovalent cation; and wherein there is from 0.001% to 1.0% by weight of the water-soluble carboxylic acid salt based upon the weight of the natural rubber latex used.

13. Process according to claim 12, wherein R contains 6 carbon atoms or from 7 to 12 carbon atoms.

14. Process according to claim 12, wherein M$^+$ is selected from the group consisting of Na$^+$, K$^+$, NH$_4^+$, and cations which are derived from alkanol amines.

15. Process according to claim 12, wherein there is from 0.005% to 0.5% by weight of the water-soluble carboxylic acid salt based upon the weight of the natural rubber latex used.

16. Process according to claim 12, wherein there is from 0.01% to 0.1% by weight of the water-soluble carboxylic acid salt based upon the weight of the natural rubber latex used.

17. Process according to claim 12, further comprising adding to said mixture from 0.05% to 1.0% by weight of at least one water-soluble base based upon the weight of the natural rubber latex used.

18. Process according to claim 12, further comprising adding to said mixture from 0.1% to 0.5% by weight of at least one water-soluble base based upon the weight of the natural rubber latex used.

19. Process according to claim 17, wherein said water-soluble base is selected from the group consisting of ammonia, potassium hydroxide, sodium hydroxide and an alkanol amine.

20. Process according to claim 12, further comprising adding to said mixture from 0.05% to 1.00% by weight of ammonia based upon the weight of the natural rubber latex used.

21. Process according to claim 12, further comprising adding to said mixture from 0.10% to 0.50% by weight of ammonia based upon the weight of the natural rubber latex used.

22. Process according to claim 12, further comprising adding to said mixture from 0.01% to 1.0% by weight of zinc oxide based upon the weight of the natural rubber latex used.

23. Process according to claim 12, further comprising adding to said mixture from 0.02% to 0.2% by weight of zinc oxide based upon the weight of the natural rubber latex used.

24. A process for the preparation of a preserved and stabilized natural rubber latex comprising the steps of providing a natural rubber latex; and forming a mixture by adding to said natural rubber latex (a) from 0.001% to 1.0% by weight of at least one water-soluble carboxylic acid salt of the formula R—COO$^-$M$^+$ in which R is selected from the group consisting of a branched alkyl radical having 4 to 17 carbon atoms and a branched alkenyl radical having 4 to 17 carbon atoms; and M$^+$ is a monovalent cation;

(b) from 0.05% to 1.0% by weight of a least one water-soluble base;

(c) from 0.05% to 1.00% by weight of ammonia;

(d) from 0.02% to 0.2% by weight of zinc oxide;

(e) the balance up to 100% by weight of said natural rubber latex; and with the weight percent of the branched carboxylic acid salt, the weight percent of the water-soluble base, the weight percent of the ammonia and the weight percent of zinc oxide each being based upon the weight of the natural rubber latex used.

25. Process according to claim 12, wherein R is selected from the group consisting of 2-ethylpentyl, 1,1-dimethylheptyl, 2,4,4-trimethylpentyl, and isododecyl.

* * * * *